(12) United States Patent
Shin et al.

(10) Patent No.: US 11,005,141 B2
(45) Date of Patent: May 11, 2021

(54) SEPARATOR COMPRISING AN ADHESION LAYER FOR AN ELECTROCHEMICAL DEVICE AND AN ELECTRODE ASSEMBLY COMPRISING THE SAME

(71) Applicant: LG CHEM, LTD., Seoul (KR)

(72) Inventors: Hyun-Kyung Shin, Daejeon (KR); Dong-Wook Sung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/881,692

(22) Filed: May 22, 2020

(65) Prior Publication Data

US 2020/0287192 A1    Sep. 10, 2020

Related U.S. Application Data

(63) Continuation of application No. 15/766,216, filed as application No. PCT/KR2017/003655 on Apr. 3, 2017, now Pat. No. 10,734,627.

(30) Foreign Application Priority Data

Apr. 1, 2016  (KR) .................. 10-2016-0040274

(51) Int. Cl.
*H01M 50/449* (2021.01)
*H01M 10/04* (2006.01)
(Continued)

(52) U.S. Cl.
CPC ......... *H01M 50/449* (2021.01); *H01M 10/04* (2013.01); *H01M 10/058* (2013.01);
(Continued)

(58) Field of Classification Search
CPC ...... H01M 2/1686; H01M 2/145; H01M 2/16; H01M 2/1653; H01M 2/166;
(Continued)

(56) References Cited

U.S. PATENT DOCUMENTS

2006/0046149 A1  3/2006  Yong et al.
2010/0323230 A1  12/2010 Lee et al.
(Continued)

FOREIGN PATENT DOCUMENTS

JP    2014-509777 A    4/2014
JP    2014-530472 A    11/2014
(Continued)

OTHER PUBLICATIONS

English translation of the Written Opinion of the International Searching Authority (Form PCT/ISA/237) for Application No. PCT/KR2017/003655, dated Jul. 10, 2017.
(Continued)

*Primary Examiner* — Stephen J Yanchuk
(74) *Attorney, Agent, or Firm* — Birch, Stewart, Kolasch & Birch, LLP

(57) ABSTRACT

The present disclosure relates to a separator for an electrochemical device and an electrode assembly comprising the same. More particularly, the present disclosure relates to a separator with improved interfacial adhesion with electrode and an electrode assembly comprising the same. The adhesion layer according to the present disclosure includes a first layer contacting a surface of the separator and a second layer formed on a surface of the first layer and contacting with an electrode, the first layer includes a polymer resin with a fluorine-containing monomer, and the second layer includes a polymer resin having a lower dissolution rate in an electrolyte solution for an electrochemical device than the polymer resin included in the first layer.

11 Claims, 4 Drawing Sheets

(51) Int. Cl.
*H01M 50/403* (2021.01)
*H01M 50/409* (2021.01)
*H01M 50/411* (2021.01)
*H01M 50/446* (2021.01)
*H01M 10/058* (2010.01)

(52) U.S. Cl.
CPC ....... *H01M 50/403* (2021.01); *H01M 50/409* (2021.01); *H01M 50/411* (2021.01); *H01M 50/446* (2021.01)

(58) Field of Classification Search
CPC ............. H01M 2/1646; H01M 2/1673; H01M 10/058; H01M 10/04; H01M 10/052; H01M 10/4235; H01M 50/449; H01M 50/403; H01M 50/409; H01M 50/411; H01M 50/446
See application file for complete search history.

(56) References Cited

U.S. PATENT DOCUMENTS

| | | |
|---|---|---|
| 2011/0259505 A1 | 10/2011 | Lee et al. |
| 2013/0084483 A1 | 4/2013 | Lee et al. |
| 2013/0260205 A1 | 10/2013 | Kwon et al. |
| 2013/0280583 A1 | 10/2013 | Lee et al. |
| 2014/0178740 A1 | 6/2014 | Ryu et al. |
| 2014/0272532 A1 | 9/2014 | Park et al. |
| 2014/0356688 A1 | 12/2014 | Yeh et al. |
| 2015/0004467 A1 | 1/2015 | Kim et al. |
| 2015/0050544 A1 | 2/2015 | Nam et al. |
| 2015/0056485 A1 | 2/2015 | Kang |
| 2015/0140403 A1 | 5/2015 | Moon et al. |
| 2016/0336614 A1* | 11/2016 | Hatta ........................ B60L 7/10 |
| 2016/0365558 A1* | 12/2016 | Kia ................... H01M 50/4295 |
| 2018/0040865 A1* | 2/2018 | Lee ..................... H01M 50/446 |

FOREIGN PATENT DOCUMENTS

| | | |
|---|---|---|
| JP | 2014-239042 A | 12/2014 |
| JP | 2015-37076 A | 2/2015 |
| JP | 2015-43311 A | 3/2015 |
| JP | 2015-43318 A | 3/2015 |
| KR | 10-2006-0021221 A | 3/2006 |
| KR | 10-2006-0116043 A | 11/2006 |
| KR | 10-2013-0091459 A | 8/2013 |
| KR | 10-2013-0136148 A | 12/2013 |
| KR | 10-2013-0136149 A | 12/2013 |
| KR | 10-2015-0025825 A | 3/2015 |
| KR | 10-2015-0057481 A | 5/2015 |

OTHER PUBLICATIONS

International Search Report for PCT/KR2017/003655 dated Jul. 10, 2017.

* cited by examiner

SEPARATOR COMPRISING AN ADHESION LAYER FOR AN ELECTROCHEMICAL DEVICE AND AN ELECTRODE ASSEMBLY COMPRISING THE SAME

CROSS-REFERENCE TO RELATED APPLICATIONS

This application is a Continuation of application Ser. No. 15/766,216 filed on Apr. 5, 2018, which is the U.S. National Phase of PCT/KR2017/003655, filed on Apr. 3, 2017, and which claims priority under 35 U.S.C. § 119(a) to Application No. 10-2016-0040274, filed in the Republic of Korea on Apr. 1, 2016, the entire contents of all of which are expressly incorporated by reference into the present application.

TECHNICAL FIELD

The present disclosure relates to a separator for an electrochemical device and an electrode assembly comprising the same. More particularly, the present disclosure relates to a separator with improved adhesion with electrode and an electrode assembly comprising the same.

BACKGROUND ART

A secondary battery is an energy storage device that is basically made up of positive electrode/negative electrode/separator/electrolyte solution and can be recharged by reversible conversion of chemical energy and electrical energy, achieving high energy density, and secondary batteries are widely used in compact electronic devices including mobile phones and laptop computers. Recently, in keeping with environmental issues, high oil price, and energy efficiency and storage, application of secondary batteries to hybrid electric vehicles (HEV), plug-in EV, e-bike, and energy storage system (ESS) is expanding at a high rate.

In manufacturing and using secondary batteries, ensuring safety is an important problem to solve. In particular, a separator commonly used in electrochemical devices shows extremely severe thermal shrinkage behaviors in some situations, for example, at high temperature, due to its material properties and manufacturing process properties, causing a stability problem such as an internal short circuit. Recently, to ensure safety of secondary batteries, an organic-inorganic composite porous separator having a porous coating layer was proposed, in which the porous coating layer is formed by coating a mixture of inorganic particles and a binder resin on a porous substrate for a secondary battery separator (see Korean Patent Application No. 10-2004-0070096). However, when an electrode assembly is formed by stacking an electrode and a separator, interlayer bonding is inadequate and there is a high risk of separation between the electrode and the separator, and in this case, inorganic particles that are detached during separation may act as local defects in a device.

To solve the problem, Korean Patent Publication No. 10-2006-0116043 discloses a method in which ethanol is added to a solution in which PVDF is dissolved in a good solvent such as acetone, and the solution is coated on a separator and dried, yielding a porous adhesion layer by a phase separation effect. The porous adhesion layer obtained by the method has advantages in terms of excellent wettability and low resistance while a battery works, while due to swelling after injection in the manufacture of the battery, the porous adhesion layer has reduced bond strength with the separator, i.e., reduced mechanical strength and low cycling characteristics, and causes interlayer mixing with a porous coating layer, resulting in clogging of the pores of the porous coating layer and eventual reduction in air permeability of the separator.

Therefore, there is an urgent demand for the development of new technology to improve the adhesion of a separator and an electrode.

DISCLOSURE

Technical Problem

The present disclosure is directed to providing an electrode assembly for an electrochemical device with improved bonding between an electrode and a separator. Other objects and advantages of the present disclosure will be understood from the following description. On the other hand, it will be easily apparent that objects and advantages of the present disclosure can be realized by the means or method defined in the appended claims, and their combination.

Technical Solution

To achieve the object, the present disclosure provides a separator for an electrochemical device. A first aspect of the present disclosure relates to a separator for an electrochemical device, and the separator includes a porous substrate, a porous coating layer formed on at least one surface of the porous substrate, the porous coating layer including a mixture of inorganic particles and a binder resin, and an adhesion layer formed on surface of the porous substrate, wherein the adhesion layer includes a first layer contacting surface of the separator and a second layer formed on surface of the first layer and contacting an electrode, and the first layer includes a low-melting point polymer resin, and the second layer includes a polymer resin having a lower dissolution rate in an electrolyte solution for an electrochemical device than the polymer resin included in the first layer.

In a second aspect of the present disclosure, according to the first aspect, the low-melting point polymer resin is a polymer resin with at least one fluorine-containing monomer selected from the group consisting of vinylidene fluoride, tetrafluoroethylene, and hexafluoropropylene.

In a third aspect of the present disclosure, according to the first or second aspect, the first layer includes the low-melting point polymer resin that is present in an amount of between 25 wt % and 75 wt % based on 100 wt % of the first layer.

In a fourth aspect of the present disclosure, according to one of the second and third aspects, the polymer resin with a fluorine-containing monomer is at least one selected from the group consisting of polyvinylidene fluoride (PVdF), polyvinylidene fluoride-co-hexafluoropropylene, and polyvinylidene fluoride-co-trichloroethylene.

In a fifth aspect of the present disclosure, according to one of the first to fourth aspects, the polymer resin having a lower dissolution rate in solvent than the polymer resin included in the first layer is a polymer resin with a repeating unit derived from unsaturated carboxylic acid ester.

In a sixth aspect of the present disclosure, according to the fifth aspect, the polymer resin with a repeating unit derived from unsaturated carboxylic acid ester is at least one selected from the group consisting of polyacrylate, polymethacrylate, polybutylacrylate, and polyacrylonitrile.

In a seventh aspect of the present disclosure, according to one of the first to sixth aspects, the polymer resin having a lower dissolution rate in solvent than the polymer resin included in the first layer is in an amount of between 25 wt % and 75 wt % based on 100 wt % of the second adhesion layer.

In an eighth aspect of the present disclosure, according to one of the first to seventh aspects, the adhesion layer is formed to coat at least part of the surface of the porous substrate.

In a ninth aspect of the present disclosure, according to one of the first to eighth aspects, the second layer coats at least part of the surface of the first layer.

In a tenth aspect of the present disclosure, according to one of the first to ninth aspects, the first layer is formed in sprite patterns on the surface of the porous coating layer, and the second layer is formed in dot form on surface of the first layer of each sprite pattern.

In an eleventh aspect of the present disclosure, according to one of the first to tenth aspects, the second layer is a polymer resin having a lower dissolution rate in an electrolyte solution for an electrochemical device than the polymer resin included in the first layer, and the polymer resin is a particulate polymer.

In addition, a twelfth aspect of the present disclosure relates to an electrode assembly for an electrochemical device, and the electrode assembly includes a negative electrode, a positive electrode and a separator, wherein the separator is interposed between the negative electrode and the positive electrode, and the separator is one of the first to eleventh aspects.

Advantageous Effects

The electrode assembly according to the present disclosure has excellent bonding between the separator and the electrode, effectively bringing the electrode and the separator into close contact, leading to high ionic conductivity therebetween, low resistance increase, and excellent life characteristics. Furthermore, inorganic particles in the porous coating layer of the separator or active material particles of the electrode are less prone to detaching due to the enhanced bonding, and thus durability of the electrode assembly is maintained for a long term. Finally, because of excellent bonding between the electrode and the porous coating layer, the porous coating layer maintains its original shape no matter how a polymer thin film substrate of the separator changes in shape, for example, shrinks, by some reasons such as a temperature rise, and thus, the porous coating layer can prevent a short circuit between electrodes instead of the polymer thin film substrate.

BRIEF DESCRIPTION OF THE DRAWINGS

The accompanying drawings illustrate preferred embodiments of the present disclosure and together with the detailed description, serve to provide an explanation of the principle of the present disclosure, and thus, the present disclosure is not limited thereto. Meanwhile, the shape, size, scale, or proportion of elements in the drawings stated in the specification may be exaggerated for clarity.

MODE FOR CARRYING OUT THE INVENTION

Hereinafter, the present disclosure will be described in detail. Prior to the description, the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, configuration presented in the embodiments stated herein is just a most preferred embodiment of the present disclosure and does not fully represent the technical concept of the present disclosure, so it should be understood that there may be various equivalents and modifications for alternative embodiments at the time the application is filed.

The present disclosure relates to a separator for an electrochemical device, and the separator has an adhesion layer on at least one outermost surface of the separator. The separator may include a porous substrate. Furthermore, the porous substrate may have a porous coating layer including inorganic particles and a binder resin on at least one surface. In the present disclosure, the adhesion layer may be formed on the surface of the separator substrate that is not coated with a porous coating layer, or when the separator substrate has a porous coating layer, the adhesion layer may be formed on the surface of the porous coating layer. Furthermore, in the present disclosure, the adhesion layer is composed of a first layer and a second layer stacked in a sequential order from the separator substrate or the porous coating layer, and the second layer contact the electrode. Furthermore, the first layer includes a polymer resin with a fluorine-containing monomer, and the second layer includes a polymer resin having a lower dissolution rate in an electrolyte solution for an electrochemical device than the polymer resin included in the first layer. The 'outermost surface' of the separator as used herein is understood as referring to a surface that contacts the electrode in the separator.

Furthermore, the present disclosure provides an electrode assembly for an electrochemical device including the separator. In the present disclosure, the electrochemical device includes any type of device that facilitates electrochemical reactions, and specifically, includes, for example, any type of primary and secondary battery, fuel cell, solar cell or capacitor such as supercapacitor. Particularly, among these secondary batteries, a lithium secondary battery including a lithium metal secondary battery, a lithium ion secondary battery, a lithium polymer secondary battery, or a lithium ion polymer secondary battery is desirable.

Hereinafter, a separator and an electrode assembly according to the present disclosure will be described in detail with reference to the drawings.

Figure 1:
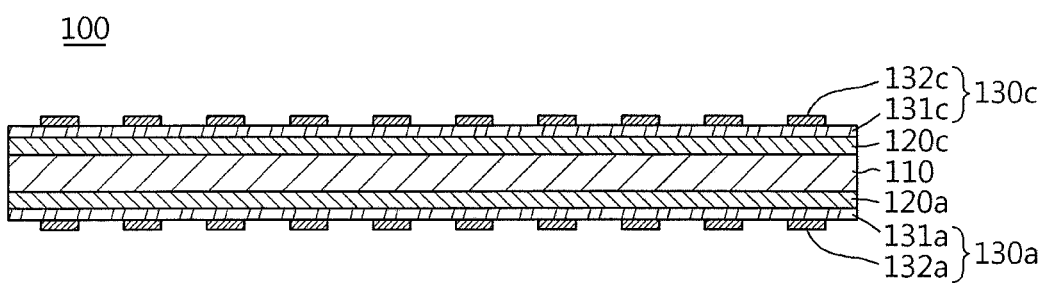
FIG. 1 depicts a cross section of a separator according to the present disclosure.

FIG. 1 schematically depicts a cross section of the separator 100 according to a specific embodiment of the present disclosure. Referring to this, the separator 100 includes a porous substrate 110, a porous coating layer 120a, 120c formed on at least one surface of the porous substrate, and an adhesion layer 130a, 130c formed on at least one surface of the porous coating layer. In the present disclosure, the adhesion layer 130a, 130c is introduced to ensure bonding of the separator and the electrode, and is provided on at least one outermost surface of the separator.

In a specific embodiment of the present disclosure, the adhesion layer has a layered structure in which a first adhesion layer (or a first layer) 131a, 131c and a second adhesion layer (or a second layer) 132a, 132c are stacked in a sequential order. The first layer is formed on the surface of the separator in contact with the surface of the separator, and the second layer is formed on the surface of the first layer, and when forming an electrode assembly, the second layer contacts the electrode. The electrode may be a positive electrode or a negative electrode.

In a specific embodiment of the present disclosure, the first layer includes a low-melting point polymer resin of which the melting point is in the range of between 120° C. and 150° C. Non-limiting examples of the low-melting point polymer resin include a polymer resin with a fluorine-containing monomer. In a specific embodiment of the present disclosure, the polymer resin with a fluorine-containing monomer may include a monomer of at least one selected from the group consisting of vinylidene fluoride, tetrafluoroethylene, and hexafluoropropylene. Specific examples of the polymer resin include polyvinylidene fluoride (PVdF), polyvinylidene fluoride-co-hexafluoropropylene, and polyvinylidene fluoride-co-trichloroethylene.

Furthermore, in addition to the low-melting point polymer resin, the first adhesion layer may further include a binder resin selected from acrylic binder resin, binder resin containing cyano group, polyvinyl alcohol-based binder resin, and polyacrylonitrile-based binder resin.

In a specific embodiment of the present disclosure, the low-melting point polymer resin is present in an amount of between 25 wt % and 75 wt % based on 100 wt % of the first adhesion layer.

In the present disclosure, the first adhesion layer has an improvement effect of dry adhesive strength due to including the low-melting point resin. That is, an excellent interfacial bond strength between the electrode and the separator in dry state before injecting an electrolyte solution improves the maintenance of close contact between the electrode and the separator.

In a specific embodiment of the present disclosure, the second electrode adhesion layer includes a polymer resin (hereinafter the low dissolution rate polymer resin) having a lower dissolution rate in an electrolyte solution for an electrochemical device than the polymer resin included in the first layer. The dissolution rate of the low dissolution rate polymer resin in electrolyte solution at room temperature (25° C.) is between 0 and 5%.

The dissolution rate of the polymer resin as used herein refers to a percentage of mass dissolved in an electrolyte solution for an electrochemical device after immersed in the electrolyte solution under the condition of 25° C. for 48 hours. Furthermore, a high temperature dissolution rate is a dissolution rate under the temperature condition of 60° C., and to clearly distinguish the dissolution rate from the high temperature dissolution rate, the dissolution rate may be written out as a room temperature dissolution rate.

In a specific embodiment of the present disclosure, the low dissolution rate polymer resin has the room temperature dissolution rate of between 0 and 5%, and the high temperature dissolution rate of between 0 and 10%. The low dissolution rate polymer resin generally tends to have high hardness at room temperature, and even though it comes into contact with an electrolyte solution, the adhesive strength is stably maintained for a long term due to the low dissolution rate.

In a specific embodiment of the present disclosure, the low dissolution rate polymer resin is a polymer resin with a monomer derived from unsaturated carboxylic acid ester. Specific examples of the monomer include methacrylic acid ester, methyl methacrylate, ethyl methacrylate, n-propyl methacrylate, i-propyl methacrylate, n-butyl methacrylate, i-butyl methacrylate, n-amyl methacrylate, i-amyl methacrylate, hexyl methacrylate, cyclohexyl methacrylate, 2-ethylhexyl methacrylate, n-octyl methacrylate, nonyl methacrylate, decyl methacrylate, hydroxymethyl methacrylate, hydroxyethyl methacrylate, ethyleneglycol methacrylate, ethyleneglycol dimethacrylate, propyleneglycol dimethacrylate, trimethylolpropane trimethacrylate, pentaerythritol tetramethacrylate, dipentaerythritol hexamethacrylate, allyl methacrylate, ethylene dimethacrylate, and acrylonitrile.

Furthermore, specific examples of the polymer resin include polyacrylate, polymethacrylate, polybutylacrylate, and polyacrylonitrile.

The low dissolution rate polymer resin is present in an amount of between 25 wt % and 75 wt % based on 100 wt % of the second adhesion layer.

As described above, the first layer includes a polymer resin with a fluorine-containing monomer such as PVdF. The polymer resin has an excellent interfacial bond strength between the electrode and the separator in dry state before injecting an electrolyte solution, and the close contact between the electrode and the separator is maintained well. However, the PVdF-based polymer resin has the reduced adhesive strength after it gets wet in an electrolyte solution. Thus, the present disclosure has the second layer including a polymer resin that has a low dissolution rate in electrolyte solution and maintains good adhesive strength even after it gets wet in electrolyte solution to prevent the reduction in adhesive strength of the adhesion layer.

Furthermore, in a specific embodiment of the present disclosure, the second layer may further include at least one binder resin selected from the group consisting of polyvinylpyrrolidone, polyvinyl acetate, polyethylene-co-vinyl acetate, polyethylene oxide, polyarylate, cyanoethylpullulan, cyanoethylpolyvinylalcohol, cyanoethylcellulose, cyanoethylsucrose, pullulan, and carboxyl methyl cellulose.

In a specific embodiment of the present disclosure, the adhesion layer may be formed to coat at least part of the separator surface. Preferably, the adhesion layer coats 20% to 80% of the separator surface, for example, the entire surface of the porous coating layer. When the coating ratio satisfies the range, a proper electrode/separator bond strength can be achieved with no excessive reduction in air permeability and/or ionic conductivity of the separator.

Furthermore, in a specific embodiment of the present disclosure, the second layer is formed to coat the surface of the first layer, at least in part or in whole.

Figure 2A:
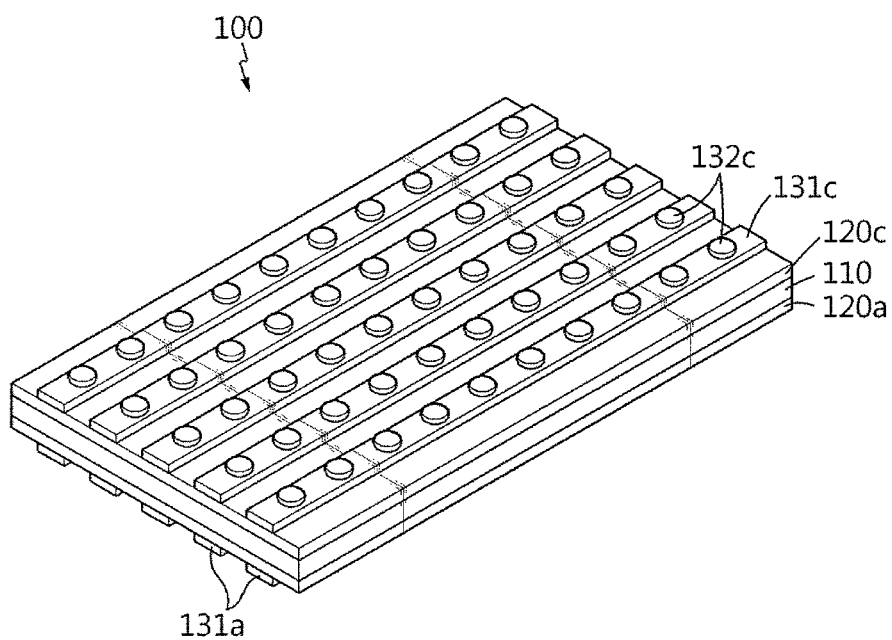
FIGS. 2a and 2b schematically depicts a separator according to a specific embodiment of the present disclosure.
Figure 2B:
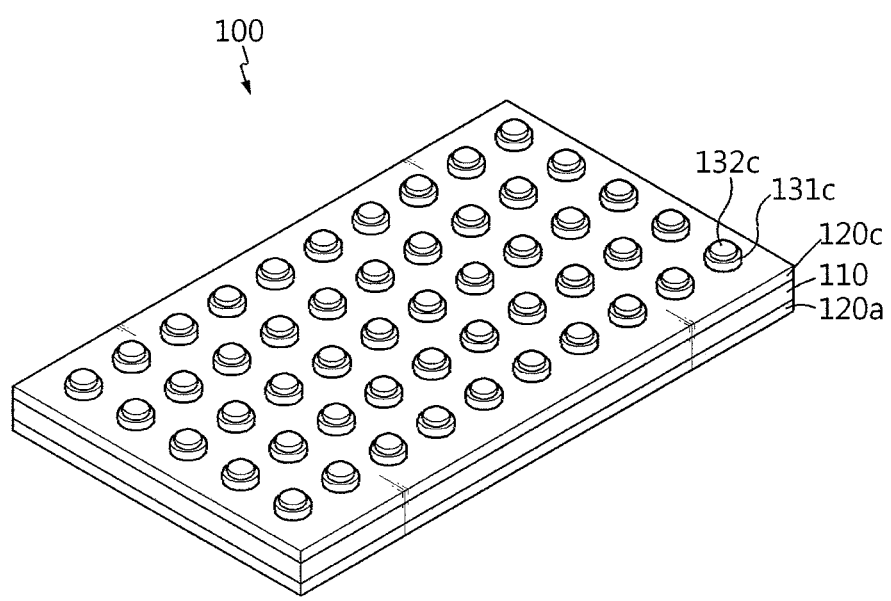

FIGS. 2a and 2b diagrammatically show the shape of the adhesion layer according to a specific embodiment of the present disclosure. Referring to this, the first layer may be formed in sprite patterns, and the second layer may be formed in point or dot form on the surface of each sprite pattern. Furthermore, in a specific embodiment of the present disclosure, the adhesion layer may be formed in dot form, and the dots are arranged on the surface of the separator at a predetermined interval. The dots may include the first layer formed on the surface of the porous coating layer and the second layer formed on the surface of the first layer. Furthermore, the second layer is formed to coat the entirety or at least part of the first layer.

FIG. 1 depicts a cross section of FIG. 2a, showing the electrode adhesion layer formed on two surfaces of the separator. The embodiments shown in the drawings are provided for illustration, and actual embodiments are not limited thereto. For example, the adhesion layer may be formed on one surface of the separator as shown in FIG. 2a and on the other surface as shown in FIG. 2b.

That is, in the present disclosure, the shape and each coating area of the adhesion layer, the first layer and the second layer may be appropriately adjusted by those skilled in the art, taking the bond strength between the electrode and the separator into account.

In the present disclosure, the thickness of the second adhesion layer is less than 50% of the thickness of the first adhesion layer. In a specific embodiment, the thickness of the first adhesion layer may be between 0.1□ and 2□, and the thickness range of the second adhesion layer may be appropriately determined based on the thickness of the first adhesion layer.

Furthermore, in a specific embodiment of the present disclosure, the second layer includes a particulate polymer resin. The particulate polymer resin may be formed in the manner of coating, on the first layer, particulate polymer resin dispersed in a dispersion medium, such as polymer particles dispersed in a solvent, for example, water, as a result of emulsion polymerization or solution polymerization of polymer particles. In a specific embodiment of the present disclosure, when the second layer includes a particulate polymer, the particulate polymer resin has a diameter of between 100 nm and 1,000 nm.

Meanwhile, in a specific embodiment of the present disclosure, the separator according to the present disclosure may or may not have a porous coating layer on the surface of the porous substrate. If a porous coating layer is not formed on the surface of the porous substrate, the adhesion layer may be formed on the surface of the porous substrate.

The following is a description of a method for preparing the separator of the present disclosure.

Figure 3:
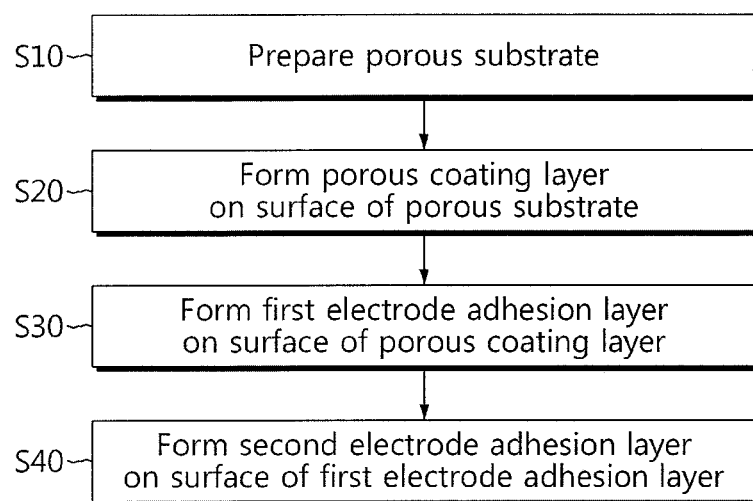
FIG. 3 is a process flow chart of a method for preparing a separator according to a specific embodiment of the present disclosure.

FIG. 3 is a flowchart of a process for preparing a separator according to a specific embodiment of the present disclosure. Referring to this, the adhesion layer may be formed by a following method.

First, a first adhesion layer-forming polymer solution is prepared. The polymer solution may be prepared by preparing a suitable solvent such as acetone or NMP, and adding a binder resin including a low-melting point polymer resin to the solvent. Subsequently, this is coated on the surface of a porous substrate or a porous coating layer and dried to remove the solvent. The coating method includes known coating methods such as dip coating, slot die coating, doctor knife coating, inkjet printing, and coating through mesh filter, and is not limited to a particular method. Furthermore, the first adhesion layer may be only formed on parts of the porous substrate or the porous coating layer as described above, and in this instance, may be formed in a predetermined pattern, for example, dot or stripe patterns.

Subsequently, a second adhesion layer is formed on the surface of the first adhesion layer. As described above, the second adhesion layer may be formed by preparing a second adhesion layer-forming slurry and coating the slurry on only parts of the surface of the first adhesion layer. According to a specific embodiment, a binder resin including a low dissolution rate polymer resin is dispersed in an aqueous solvent such as water, and the result is coated on the first adhesion layer. In this instance, the second adhesion layer-forming slurry may be only coated on parts of the surface of the first adhesion layer using mesh filter. Subsequently, the slurry is dried to remove the solvent, yielding a second adhesion layer.

Rather, the preparation method describes a specific embodiment among various methods for manufacturing an electrode adhesion layer, and is not limited to the foregoing method. Besides, the electrode adhesion layer may be manufactured by various methods.

The following is a description of configuration of the components of the electrode assembly of the present disclosure, a negative electrode, a positive electrode, and a separator.

In the present disclosure, the porous substrate includes those that can be generally used in a separator of an electrochemical device without any particular limitation. The porous substrate includes, but is not limited thereto, for example, a nonwoven fabric or a porous polymer film or stacks of two or more of the nonwoven fabric and the porous polymer film made of at least one of polymer resins such as polyolefin, polyethyleneterephthalate, polybutyleneterephthalate, polyacetal, polyamide, polycarbonate, polyimide, polyetheretherketone, polyethersulfone, polyphenylene oxide, polyphenylene sulfide and polyethylene naphthalene.

In the present disclosure, the thickness of the porous substrate may be between 5 and 50□. The range of the porous substrate is not particularly limited to the foregoing range, but when the thickness is much less than the lower limit, the mechanical properties degrade, and the separator is more likely to be damaged while the battery is being used. On the other hand, there is no particular limitation as to the pore size and porosity in the porous substrate, but the pore size may be between 0.01 and 50□ and the porosity may be between 10 and 95%.

In the present disclosure, the porous coating layer is formed of a mixture of inorganic particles and a binder resin, and as the surface of the porous substrate is coated with inorganic particles, the heat resistance and the mechanical properties of the separator substrate are further improved. By virtue of interstitial volume between inorganic particles, the porous coating layer not only has a microporous structure but also serves as a sort of spacer to mechanically maintain the shape of the coating layer. The interstitial volume refers to a space defined between adjacent inorganic particles substantially coming into contact with each other. Furthermore, because the inorganic particles generally do not change in physical properties at high temperature of 200° C. or above, the outstanding heat resistance is given to the separator by the formed porous coating layer. In the present disclosure, the thickness of the porous coating layer is between 1□ and 50□, or between 2□ and 30□, or between 2□ and 20□.

The porous coating layer may be manufactured by a method in which inorganic particles are added to a mixture containing a binder resin dissolved or dispersed in a suitable solvent such as water to prepare a homogeneous slurry, and the slurry is coated on at least one surface of the porous substrate. The coating method includes dip coating, die coating, roll coating, comma coating, or their combination.

In the porous coating layer, a content ratio of the inorganic particles and the binder resin is determined, taking into account the thickness, pore size, and porosity of the finally manufactured porous coating layer of the present disclosure, and the amount of the inorganic particles is between 50 and 99.9 wt % or between 70 and 99.5 wt %, and the amount of the binder resin is between 0.1 and 50 wt % or between 0.5 and 30 wt % on a weight ratio basis. When the amount of the inorganic particles is less than 50 wt %, and in turn the binder resin content is too high, voids between inorganic particles are reduced, and as a consequence, the pore size and porosity reduces, causing the final battery performance to degrade. On the contrary, when the amount of the inorganic particles exceeds 99.9 wt %, and in turn the binder resin content is too low, the adhesive strength between inorganics reduces, causing the mechanical properties of the final porous coating layer to degrade.

According to a specific embodiment of the present disclosure, there is no limitation as to the size of the inorganic particles of the porous coating layer, but for the benefit of a coating layer with uniform thickness and proper porosity, the size of the inorganic particles may range between 0.001 and 10□ if possible. When the size of the inorganic particles satisfies the range, dispersion is maintained, adjustment of the properties of the separator is made easy, an increase in thickness of the porous coating layer is avoided, the mechanical properties are improved, and there is a low probability that an internal short circuit occurs during charge•discharge due to too large pore size.

In the present disclosure, the inorganic particles are not limited to a particular type so long as they are electrochemically stable. That is, the inorganic particles are not limited to a particular type if they do not cause any oxidation and/or reduction reaction in the operating voltage range (for example, 0~5V for Li/Li+) of the electrochemical device applied. In a specific embodiment of the present disclosure, the inorganic particles include, for example, at least one selected from the group consisting of $BaTiO_3$, $Pb(Zr,Ti)O_3$ (PZT), $Pb_{1-x}La_xZr_{1-y}TiyO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $TiO_2$, and $TiO_2$.

Furthermore, in the present disclosure, the glass transition temperature (Tg) of the binder polymer resin (second binder resin) included in the porous coating layer ranges between −100° C. and 200° C. It is because this improves the mechanical properties of the separator such as flexibility and elasticity. Furthermore, the second binder resin stably holds the adhesion between inorganic particles, contributing to the prevention of mechanical property degradation of the finally manufactured porous coating layer.

Non-limiting examples of binder resin available in the present disclosure include at least one selected from the group consisting of polyvinylidene fluoride (PVdF), polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cyanoethylpullulan, cyanoethylpolyvinylalcohol, cyanoethylcellulose, cyanoethylsucrose, pullulan, and carboxyl methyl cellulose.

Meanwhile, the pore size and porosity of the porous coating layer preferably ranges between 0.001 and 10□ and between 5 and 95%, respectively.

In the present disclosure, the electrode assembly includes two or more electrodes and one or more separators, in which the separator is interposed between the electrodes with opposite polarities. Here, the separator has the properties of the present disclosure described above.

The electrode includes a current collector, and an electrode active material layer formed on at least one surface of the current collector. The electrode active material layer includes an electrode active material, a binder polymer resin, and a conductive material.

For the current collector, in the case of a positive electrode, foils made of aluminum, nickel or their combination are available, and in the case of a negative electrode, foils made of copper, gold, nickel or copper alloy or their combination are available. However, the current collector is not limited thereto, and may be appropriately selected.

In the electrode active material, a positive electrode active material includes general positive electrode active materials commonly used in a positive electrode of electrochemical devices. Its non-limiting examples preferably include lithium intercalation materials such as lithium manganese oxide, lithium cobalt oxide, lithium nickel oxide, lithium iron oxide, or composite oxide thereof. Furthermore, a negative electrode active material includes general negative electrode active materials commonly used in a negative electrode of electrochemical devices. Its non-limiting examples preferably include lithium intercalation materials such as lithium metal or lithium alloy, carbon, petroleum coke, activated carbon, graphite, or other carbons.

In a specific embodiment of the present disclosure, non-limiting examples of the binder polymer resin included in the electrode active material layer include polyvinylidene-fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, styrene butadiene rubber, or their mixtures. In addition, any material commonly used in the technical field to which the present disclosure belongs may be used singly or in combination. In a specific embodiment of the present disclosure, the binder resin may be applied to both the negative electrode and the positive electrode, and may be appropriately selected based on the electrode properties.

Meanwhile, in the present disclosure, with regard to the disclosure not stated in the specification in the description of the electrode and/or the electrode assembly, general materials or methods used in the technical field to which the present disclosure belongs may be applied.

Hereinafter, examples are described in detail to specifically explain the present disclosure. The examples according to the present disclosure, however, may be modified in many other forms, and the scope of the present disclosure should not be construed as being limited to the following examples. The examples of the present disclosure are provided to explain the present disclosure more clearly and fully to those having ordinary knowledge in the art to which the present disclosure pertains.

Example

1) Manufacture of Negative Electrode

Artificial graphite, carbon black, CMC, and SBR in 95.8:1:1.2:2 weight ratio were mixed with water to prepare a negative electrode slurry. The negative electrode slurry was coated on a copper foil (Cu-foil) to the thickness of 14□ to form a thin polar plate, which was then dried at 135° C. for 3 hours or longer and pressed, yielding a negative electrode.

2) Manufacture of Positive Electrode $LiNi_{0.5}Mn_{0.3}Co_{0.2}O_2$, PVdF, and carbon black in 96:2:2 weight ratio were mixed with N-methylpyrrolidone to prepare a positive electrode slurry. The positive electrode slurry was coated on an aluminum thin film to the thickness of 60□ to form a thin polar plate, which was then dried at 135° C. for 3 hours or longer and pressed, yielding a positive electrode. In this instance, positive electrode loading was 3.3 mAh/cm$^2$, and an NP ratio was 108.

3) Manufacture of Separator

At room temperature, $Al_2O_3$ inorganic particles (Nippon light metal, LS235, particle size 510 nm) and PVdF were added to acetone and stirred to prepare a homogeneous dispersed slurry. The slurry had a 98:2 weight ratio of the inorganic particles and the binder. The slurry was coated on two surfaces of a polyethylene porous substrate (W scope, WL11B, air permeation time 150 sec/100 cc) using doctor blade, and dried to form a porous coating layer.

Subsequently, PVDF (melting point 135° C.) and polyacrylonitrile were added to acetone to prepare a first adhesion layer-forming slurry. The slurry had a 8:2 weight ratio of PVDF and polyacrylonitrile. The slurry was coated on the surface of the porous coating layer using mesh filter (20☐) to form a first adhesion layer. The dots were arranged at an interval of about 120☐. Subsequently, hot air drying was performed to remove the solvent.

Subsequently, polyacrylate (room temperature dissolution rate 3%) and SBR were dispersed in water to prepare a second electrode adhesion layer-forming slurry. The slurry had a 8:2 weight ratio of polyacrylate and SBR. The slurry was coated on the first electrode adhesion layer using mesh filter (100☐), and the position of the mesh was adjusted to form a second adhesion layer on the upper surface of the first adhesion layer. Subsequently, hot air drying was performed to remove the solvent.

4) Manufacture of Electrode Assembly

The negative electrode, the positive electrode, and the separator obtained in preparation examples 1) to 3) were stacked and laminated using hot pressing to manufacture an electrode assembly. In this instance, the pressing conditions were 90° C., 8 MPa.

5) Manufacture of Battery

The negative electrode, the positive electrode, and the separator obtained in preparation examples 1) to 3) were stacked to manufacture an electrode assembly. The obtained electrode assembly was rolled and charged in a case, and an electrolyte solution was injected to manufacture a battery. For the electrolyte solution, a mixture of ethylenecarbonate and ethylmethylcarbonate (7:3, volume ratio) was used, and the concentration was adjusted to 1M LiPF$_6$.

Comparative Example

An electrode assembly and a battery were manufactured by the same method as example except that a second adhesion layer was not formed in a separator.

5) Evaluation of Properties

A. Evaluation of Adhesive Strength

With the electrode assembly manufactured through example and comparative example, the adhesive between the negative electrode and the separator was evaluated and the results are summarized and shown in the following Table 1. Experiment 1 was carried out to test the adhesive strength of the electrode assembly of each example and comparative example in dry state before immersing the electrode assembly in an electrolyte solution. Experiment 2 was carried out to test the adhesive strength of each electrode assembly in undry state after immersing the electrode assembly in an electrolyte solution (ethylenecarbonate:ethylmethylcarbonate=7:3, volume ratio) and taking out of it. The immersion in the electrolyte solution was performed under the electrolyte solution 45° C. condition for 12 hours. The adhesive strength was measured using 90° peel test using a tension tester.

TABLE 1

| Bond strength Unit (N/m) | Experiment 1 Before immersion in electrolyte solution | Experiment 2 After immersion in electrolyte solution |
| --- | --- | --- |
| Example 1-1 | 26.5 | 2.01 |
| Example 1-2 | 27.3 | 2.12 |
| Example 1-3 | 27.5 | 2.08 |

TABLE 1-continued

| Bond strength Unit (N/m) | Experiment 1 Before immersion in electrolyte solution | Experiment 2 After immersion in electrolyte solution |
| --- | --- | --- |
| Comparative example 1-1 | 26.6 | 1.31 |
| Comparative example 1-2 | 25.9 | 1.25 |
| Comparative example 1-3 | 27.4 | 1.35 |

As can be seen from Table 1, in the case of experiment 1, the adhesive strength between the negative electrode and the separator in the electrode assembly according to example and comparative example was measured similar, while in the case of experiment 2, the adhesive strength between the negative electrode and the separator in the electrode assembly according to example was found excellent.

B. Evaluation of Resistance Increase (in Percent)

For the battery manufactured in example and comparative example, the resistance increase (in percent) was measured after 300 cycle charge/discharge under the condition of 45° C. and the results were summarized and shown in the following Table 2. The battery was charged and discharged under the conditions of 1.0 C and 3.0V-4.2V, and charge was performed in CC/CV mode and discharge was performed in CC mode. In the case of example, the resistance increase was found lower than comparative example, and it is deemed that this is because the battery according to example has higher adhesive strength between the electrode and the separator than the battery of comparative example due to the second adhesion layer.

TABLE 2

| Unit (%) | Resistance increase (in percent) |
| --- | --- |
| Example | 2% |
| Comparative example | 5% |

While the present disclosure has been hereinabove described with regard to a limited number of embodiments and drawings, the present disclosure is not limited thereto and it is obvious to those skilled in the art that various changes and modifications can be made thereto within the technical aspects of the present disclosure and the scope of equivalents to which the appended claims are entitled.

What is claimed is:

1. A separator having for an electrochemical device, comprising:
    a porous substrate; and
    a porous coating layer on at least one surface of the porous substrate, the porous coating layer comprising a mixture of inorganic particles and a first binder resin;
    a first adhesion layer on either a surface of the porous substrate where a porous coating layer is not formed, or a surface of the porous coating layer if the surface of the porous substrate is coated with the porous coating layer,
    wherein the first adhesion layer comprises a low-melting point polymer resin and a second binder resin,
    wherein the low-melting polymer resin is a polymer resin having a melting point of 120° C. to 150° C. and containing at least one fluorine-containing monomer selected from the group consisting of vinylidene fluoride, tetrafluoroethylene, and hexafluoropropylene;
    a second adhesion layer on a surface of the first adhesion layer and in contact with an electrode, wherein the second adhesion layer comprises a polymer resin having a lower dissolution rate in an electrolyte solution for an electrochemical device than the polymer resin included in the first adhesion layer, and the second adhesion layer is present on a part of the surface of the first adhesion layer.

2. The separator for an electrochemical device according to claim 1, wherein the first adhesion layer comprises the low-melting point polymer resin present in an amount of between 25 wt % and 75 wt % based on 100 wt % of the first adhesion layer.

3. The separator for an electrochemical device according to claim 1, wherein the polymer resin with a fluorine-containing monomer is at least one selected from the group consisting of polyvinylidene fluoride (PVdF), polyvinylidene fluoride-co-hexafluoropropylene, and polyvinylidene fluoride-co-trichloroethylene.

4. The separator for an electrochemical device according to claim 1, wherein the polymer resin having a lower dissolution rate in solvent than the polymer resin included in the first adhesion layer is a polymer resin with a repeating unit derived from unsaturated carboxylic acid ester.

5. The separator for an electrochemical device according to claim 4, wherein the polymer resin with a repeating unit derived from unsaturated carboxylic acid ester is at least one selected from the group consisting of polyacrylate, polymethacrylate, polybutylacrylate, and polyacrylonitrile.

6. The separator for an electrochemical device according to claim 1, wherein the polymer resin having a lower dissolution rate in solvent than the polymer resin included in the first adhesion layer is present in an amount of between 25 wt % and 75 wt % based on 100 wt % of the second adhesion layer.

7. The separator for an electrochemical device according to claim 1, wherein the first adhesion layer coats at least part of either the surface of the porous substrate or the surface of the porous coating layer.

8. The separator for an electrochemical device according to claim 1, wherein the second adhesion layer coats at least part of the surface of the first adhesion layer.

9. The separator for an electrochemical device according to claim 1, wherein the first adhesion layer is formed in sprite patterns on the surface of the porous coating layer, and the second adhesion layer is formed in dot form on surface of the first adhesion layer of each sprite pattern.

10. The separator for an electrochemical device according to claim 1, wherein the second adhesion layer is a polymer resin having a lower dissolution rate in an electrolyte solution for an electrochemical device than the polymer resin included in the first adhesion layer, and the polymer resin is a particulate polymer.

11. An electrode assembly comprising a negative electrode, a positive electrode, and a separator, wherein the separator is interposed between the negative electrode and the positive electrode, and the separator is defined in claim 1.

* * * * *